United States Patent [19]
Corporon et al.

[11] Patent Number: 6,086,100
[45] Date of Patent: Jul. 11, 2000

[54] METHOD AND APPARATUS FOR TRANSFERRING REAR SHOULDER BELT LOADS TO A VEHICLE FRAME

[75] Inventors: Max A. Corporon, Bloomfield Hills; Victoria A. Salmonowicz, St. Clair Shores; Norman B. Robbins, Davison, all of Mich.

[73] Assignee: Chrysler Corporation, Auburn Hills, Mich.

[21] Appl. No.: 09/002,318

[22] Filed: Jan. 2, 1998

[51] Int. Cl.[7] ............................ B60R 22/24; B62D 25/02; B62D 25/04
[52] U.S. Cl. ................. 280/808; 296/203.03; 296/203.04
[58] Field of Search ..................................... 280/808, 807, 280/801.1; 296/203.03, 203.04, 195; 297/483, 475, 474

[56] References Cited

U.S. PATENT DOCUMENTS

| | | | |
|---|---|---|---|
| 4,408,794 | 10/1983 | Harasaki | 296/195 |
| 5,018,780 | 5/1991 | Yoshii et al. | 296/203.04 |
| 5,344,188 | 9/1994 | Mims et al. | 280/808 |
| 5,397,152 | 3/1995 | Kawamura | 280/808 |

Primary Examiner—Peter C. English
Attorney, Agent, or Firm—James R. Yee

[57] ABSTRACT

An apparatus for transferring rear shoulder belt loads to a frame of a motor vehicle includes a unitarily constructed reinforcement member. The reinforcement member is welded or otherwise fixedly attached to a C-pillar joint construction. The C-pillar joint construction includes an upwardly extending strut tower which is welded to a rail of the vehicle frame. The reinforcement member includes an upper end to which a turning loop of a rear seat belt assembly is attached, and a lower end to which a retractor mechanism of the seat belt assembly is attached. Loads from the seat belt are transferred from the reinforcement member through the strut tower and to the rail.

11 Claims, 5 Drawing Sheets

METHOD AND APPARATUS FOR TRANSFERRING REAR SHOULDER BELT LOADS TO A VEHICLE FRAME

BACKGROUND OF THE INVENTION

1. Technical Field

The present invention generally relates to motor vehicles. More particularly, the present invention relates to a method and apparatus for transferring rear shoulder belt loads to a vehicle frame.

2. Discussion

In addition to housing passengers and supporting a vehicle's systems, a vehicle's body shell performs four essential structural functions: suspension support, noise attenuation, shake control, and crash energy management. One aspect of the vehicle structure that can affect these characteristics and which can be designed to optimize them is the "C" pillar design. Typically an automotive body has several "pillars", commonly referred to as the "A", "B", and "C" pillars. Some vehicles also have a "D" pillar. These pillars come in pairs, one on each side of the vehicle body. The A-pillar is the front pillar that supports the windshield and front of the roof. The B-pillar is the side post that connects the roof to the rocker panel. The C-pillar supports the back window and the rear portion of the car's roof. In some vehicles, such as sport utilities vehicles, there is also a D-pillar that supports the rearmost section of the roof.

Known C-pillar joint constructions rely on single horizontal fore-aft attachments of the C-pillar to the vehicle underbody. These designs are prone to "parallelogramming", which occurs when the aperture of the rear window, the aperture being the circumferential periphery of the window, causes a bending or flexing of the C-pillar about the horizontal fore/aft attachment line to the body. This flexing reduces body torsional stiffness and allows parallelogramming movement/deflection of the rear window aperture, resulting in increased backlight to body squeak. Indeed, in known constructions the base of the C-pillar almost becomes a flex concentration point for lateral inputs, the horizontal weld orientation serving as a hinge or fulcrum line. To counter this tendency, substantial reinforcements or "gussets" typically are required in such designs, requiring extra weight and assembly time.

SUMMARY OF THE INVENTION

An improved C-pillar joint construction is shown and described in commonly assigned U.S. Ser. No. 08/994,070 (filed Dec. 19, 1997) entitled "Vertical C-Pillar Joint Construction". This application, which is incorporated by reference as if fully set forth herein, discloses a tubular dual vertical C-pillar joint construction. The C-pillar has a tubular cross-section and is welded to the underbody in a substantially vertically orientation. The C-pillar tubular cross-section also extends below the plane of attachment of the rear window aperture to the body. A vertical weld connection is made between the C-pillar and each of two vertical, outwardly extending walls of a suspension strut tower, which in turn is connected to the vehicle rear rail, to create a direct load path from the C-pillar to the rail.

The present invention is directed to a method and apparatus for transferring rear shoulder belt loads to the frame of a vehicle. In one specific application, the teachings of the present invention are adapted to cooperate with the C-pillar joint construction disclosed in U.S. Ser. No. 08/994,070. However, it will become apparent to those skilled in the art that the teachings are not so limited and have applicability for various other applications.

Thus, it is a general object of the present invention to provide a method and apparatus for more effectively transferring rear seat belt loads to the frame of a motor vehicle.

It is a more specific object of the present invention to provide a reinforcement member for a C-pillar joint construction to which the turning loop and retractor assembly of a rear seat belt assembly are mounted.

It is another object of the present invention to provide a C-pillar joint construction that more efficiently transfer seat belt loads from a rear seat occupant restraint system to the frame of the vehicle.

In one form, the present invention provides an anchor for use in a vehicle having a frame with an upwardly extending column and equipped with a rear shoulder belt restraint system. The rear shoulder belt restrain system has a belt capable of being buckled together, a belt retractor mechanism and a turning loop. The anchor comprises a unitarily constructed bracket having upper means and lower means. The upper means is operative for securing the turning loop device. The lower means is operative for securing the belt retractor mechanism. The bracket has a neck region which spans between the upper and lower means and is mounted to the column of the vehicle.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
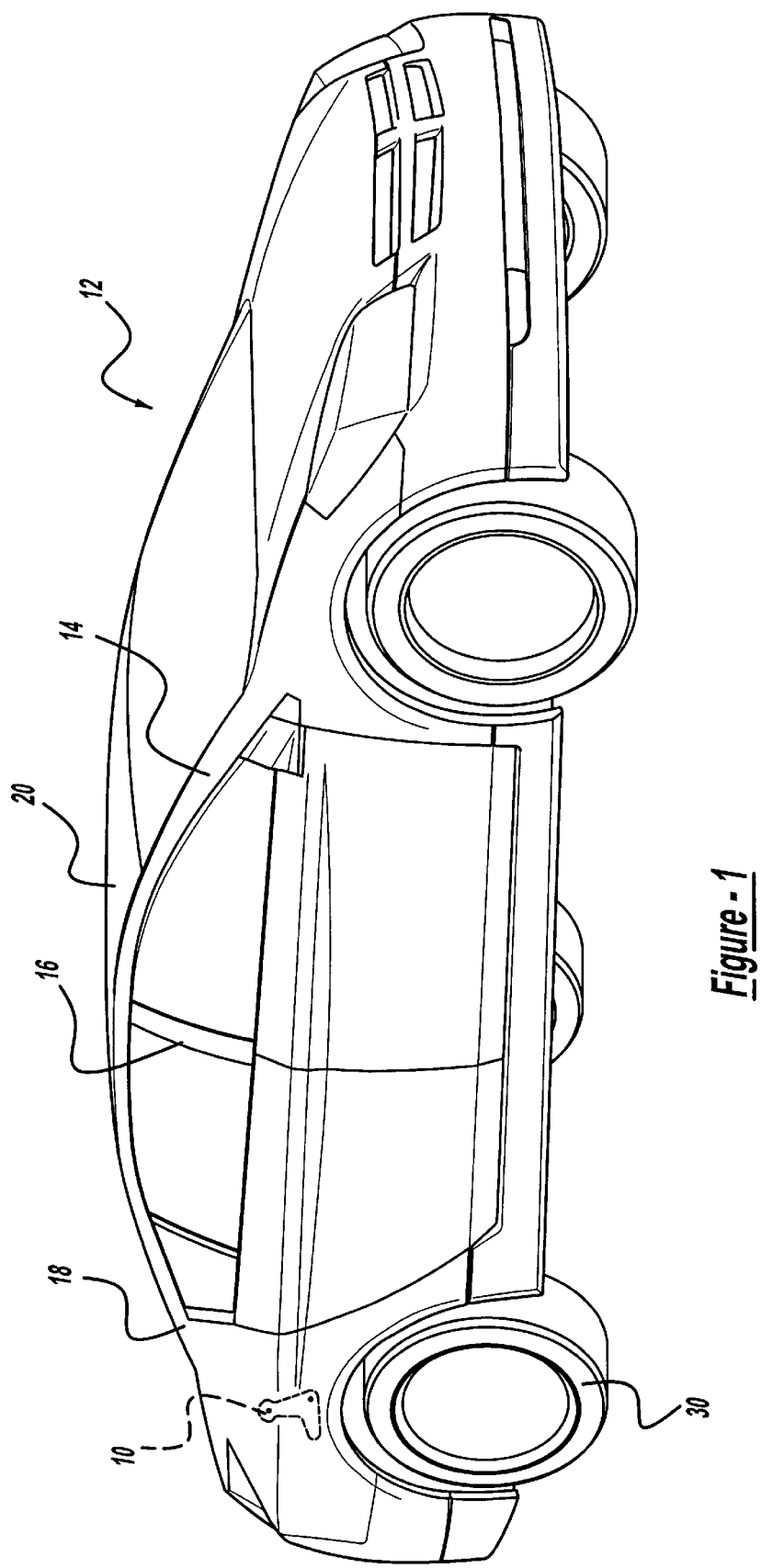
FIG. 1 is an environmental view of a reinforcement member constructed in accordance with the teachings of a preferred embodiment of the present invention and operative for transferring rear shoulder belt loads to a frame of a motor vehicle installed within an exemplary motor vehicle.

With initial reference to FIG. 1, a reinforcement member or anchor constructed in accordance with the teachings of a preferred embodiment of the present invention is illustrated in phantom lines and generally identified at reference numeral 10. The reinforcement member 10 is shown operatively installed within in an exemplary motor vehicle 12. As will become apparent to those skilled in the art, the exemplary application shown throughout the drawings is intended to transfer rear shoulder belt loads to a frame of the vehicle 12. It will be appreciated that the teachings of the present invention have applicability to a wide range of vehicles and are not limited to the application shown in the drawings. It will also be appreciated that the apparatus 10 of the present invention is used on both sides of the vehicle 12 in an identical mirror image manner. For simplicity and ease of explanation, the subject invention will be described only in connection with the right side of the vehicle 12.

Figure 2:
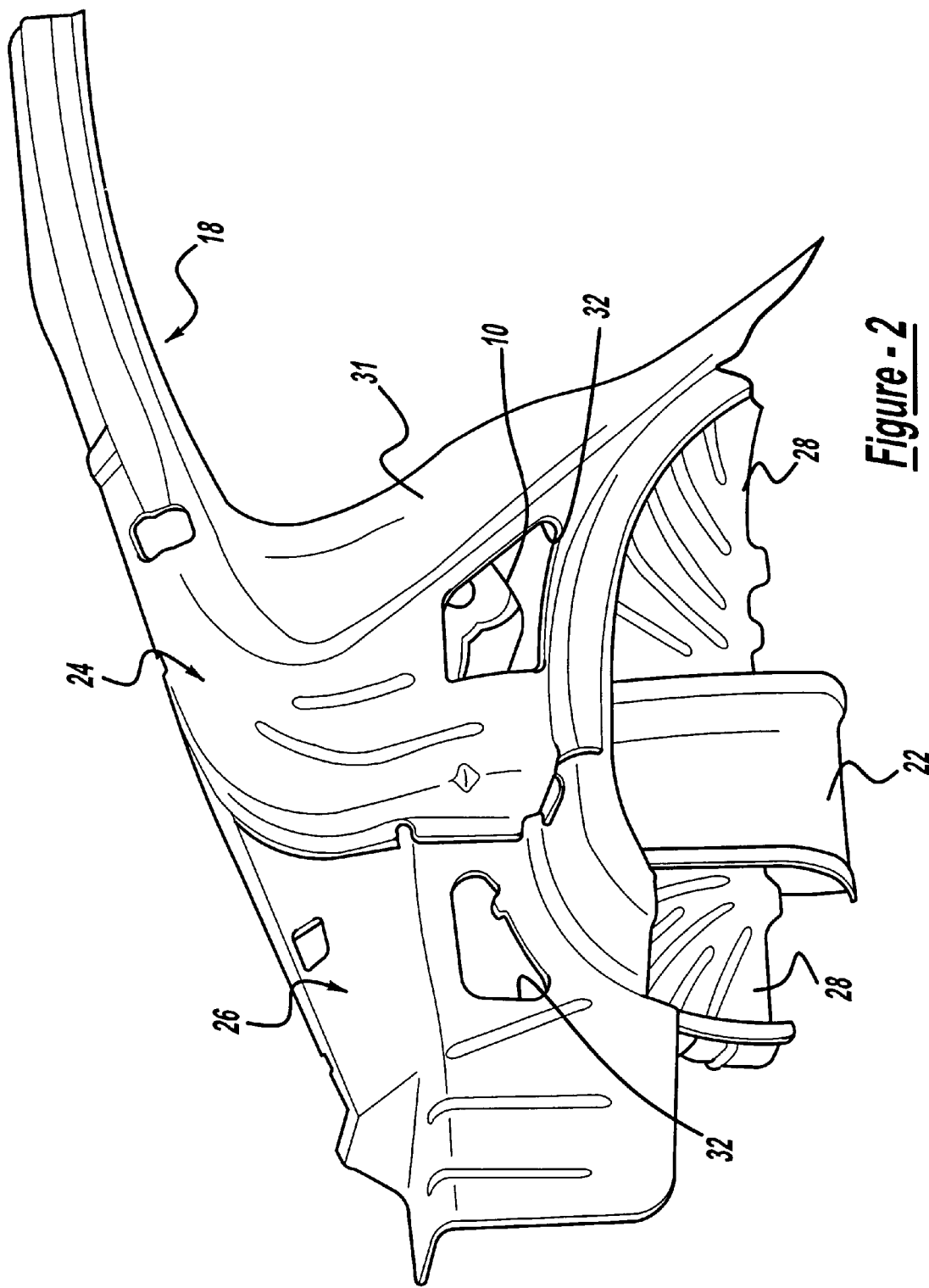
FIG. 2 is a perspective view of a portion of the exemplary vehicle of FIG. 1 with the outer skin of the vehicle removed for purposes of illustration.
Figure 3:
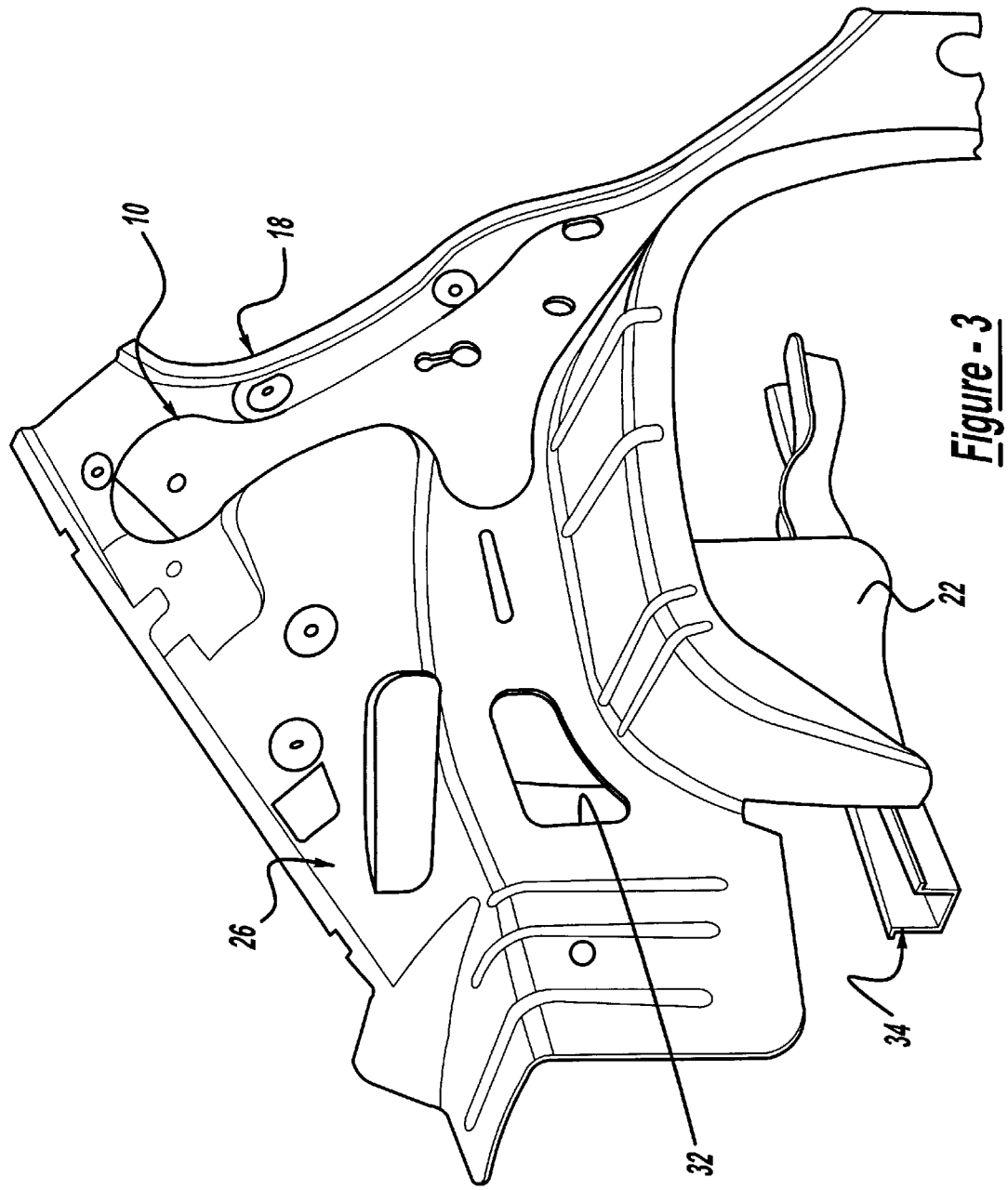
FIG. 3 is a view similar to FIG. 2 with the body side outer member removed for purposes of further illustrating the location of the reinforcement member of FIG. 1.

With continued reference to FIG. 1 and additional reference to FIGS. 2 and 3, a brief understanding of cooperating structure of the exemplary vehicle 12 insofar as it relates to the present invention is warranted. The pertinent structure of the exemplary vehicle 12 is shown and described in greater detail in commonly assigned U.S. Ser. No. 08/994,070 (filed Dec. 19, 1997) entitled "Vertical C-Pillar Joint Construction" which is discussed above, which is now abandoned. This application is incorporated by reference as if fully set forth herein.

Briefly, the exemplary vehicle is shown to include an A-pillar 14, a B-pillar 16, and C-pillar 18. The C-pillar 18 extends downward from roof 20 and conventionally functions to partially define a rear window opening (not shown). Below the surface sheet metal, the C-pillar 18 includes a strut tower 22, a body side outer member 24, a quarter inner member 26, and a wheel house member 28 which surrounds a tire 30. It should be understood, however, that the apparatus 10 of the invention lies below the vehicle's "skin" and normally cannot be seen when viewing the vehicle 12. FIG. 1 shows the location of the apparatus 10 of the present invention relative to the vehicle 12 as a whole. As used herein, it will be understood that the term "C-pillar 18" includes strut tower 22, body side outer member 24, quarter member 26 and wheel house member 28.

As specifically shown in FIG. 2, the C-pillar 18 can be seen extending downwardly from the roof 20. The C-pillar 18 defines flange 31 which receives the door of the vehicle when closed. Immediately beneath the sheet metal is the body side outer member 24, which is the base component of the C-pillar structure, quarter inner member 26, strut tower 22, and wheel housing members 28. The body side outer member 24 and quarter inner member 26 define welding access openings 32. These openings allow entry of robotic welding equipment during the vehicle assembly process. A longitudinally extending rear frame rail 34 (shown in FIG. 3) is welded to the strut tower 22. The wheel house members 28 are in turn welded to the strut tower 22. The strut tower 22 connects to both the quarter inner member 26 and the body side outer member 24. The quarter inner and body side outer members 24 and 26 connected in this fashion form the basic tubular structure of the C-pillar joint construction and extend vertically to the rear rail 34 via the strut tower 22, creating a load path originating in the C-pillar 18 and extending through the strut tower 22 to the rear rail 34. This structure, which is tubular for added strength, is made below the point of attachment of the rear window aperture to the vehicle structure and reduced parallelogramming.

Figure 5:
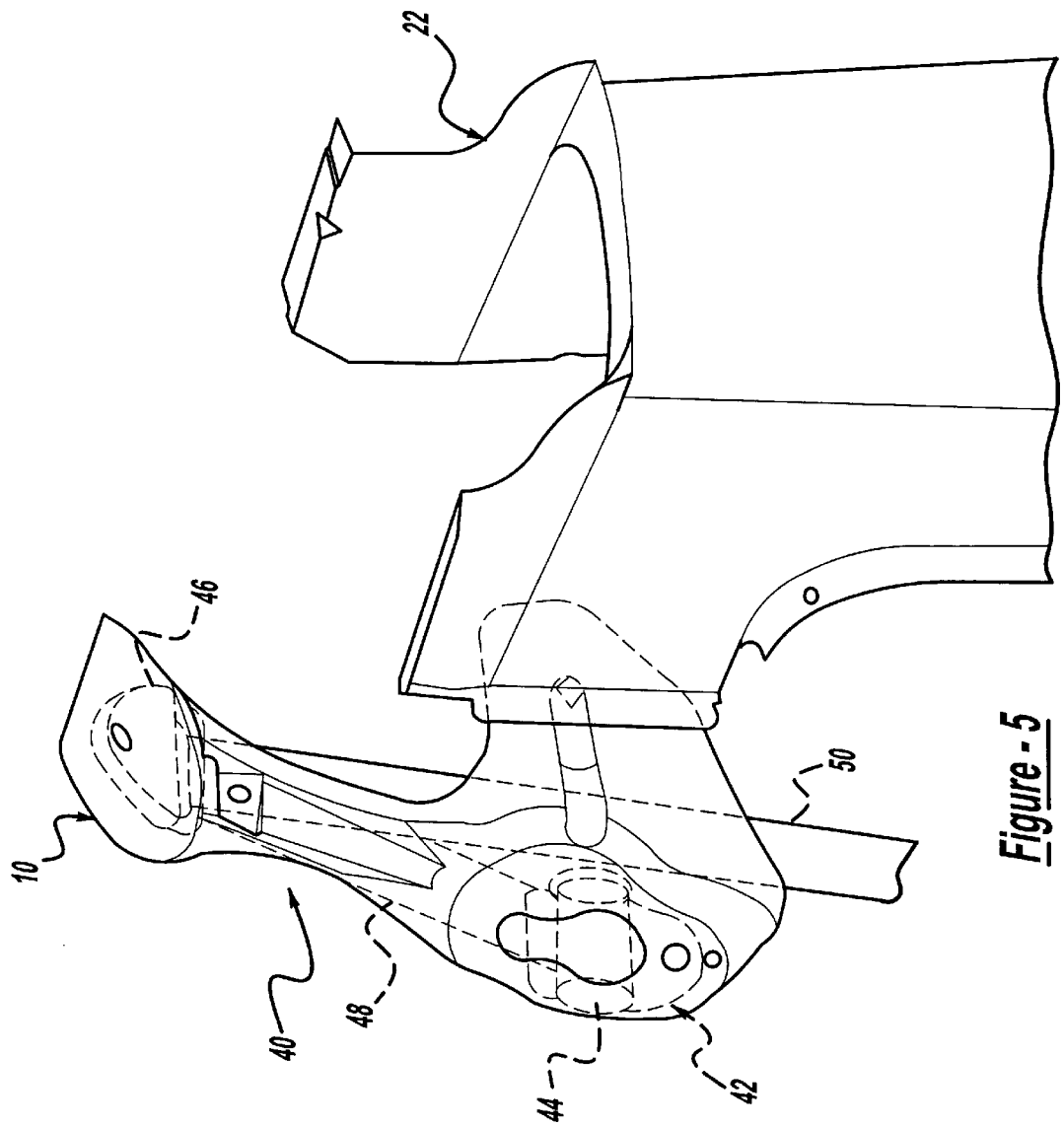
FIG. 5 is a perspective view of the reinforcement member and strut tower of FIG. 3 taken in an outboard direction with the quarter inner member removed to illustrate the interconnection between the strut tower and reinforcement member, and further illustrated to include a rear shoulder belt assembly (in phantom) operatively arranged with the reinforcement member.

With reference to FIG. 5, the motor vehicle 12 will be understood to include a rear seat belt arrangement 40 which is largely of conventional construction. The rear seat belt arrangement 40 includes a retractor 42 having a spool assembly 44 and a turning loop 46. A belt webbing 48 is wound about the spool assembly 44 and upwardly extends to the turning loop 46. The belt webbing 48 downwardly extends from the turning loop 46 and functions as a rear shoulder belt 50. In a conventional manner, the rear shoulder belt 50 is adapted to diagonally traverse a torso of a rear seat occupant (not shown). While not shown, it will be understood that the seat belt webbing 48 conventionally carries a latch plate adapted to releasably engage a buckle interconnected to the vehicle frame and positioned adjacent to the rear seat pan.

Figure 4:
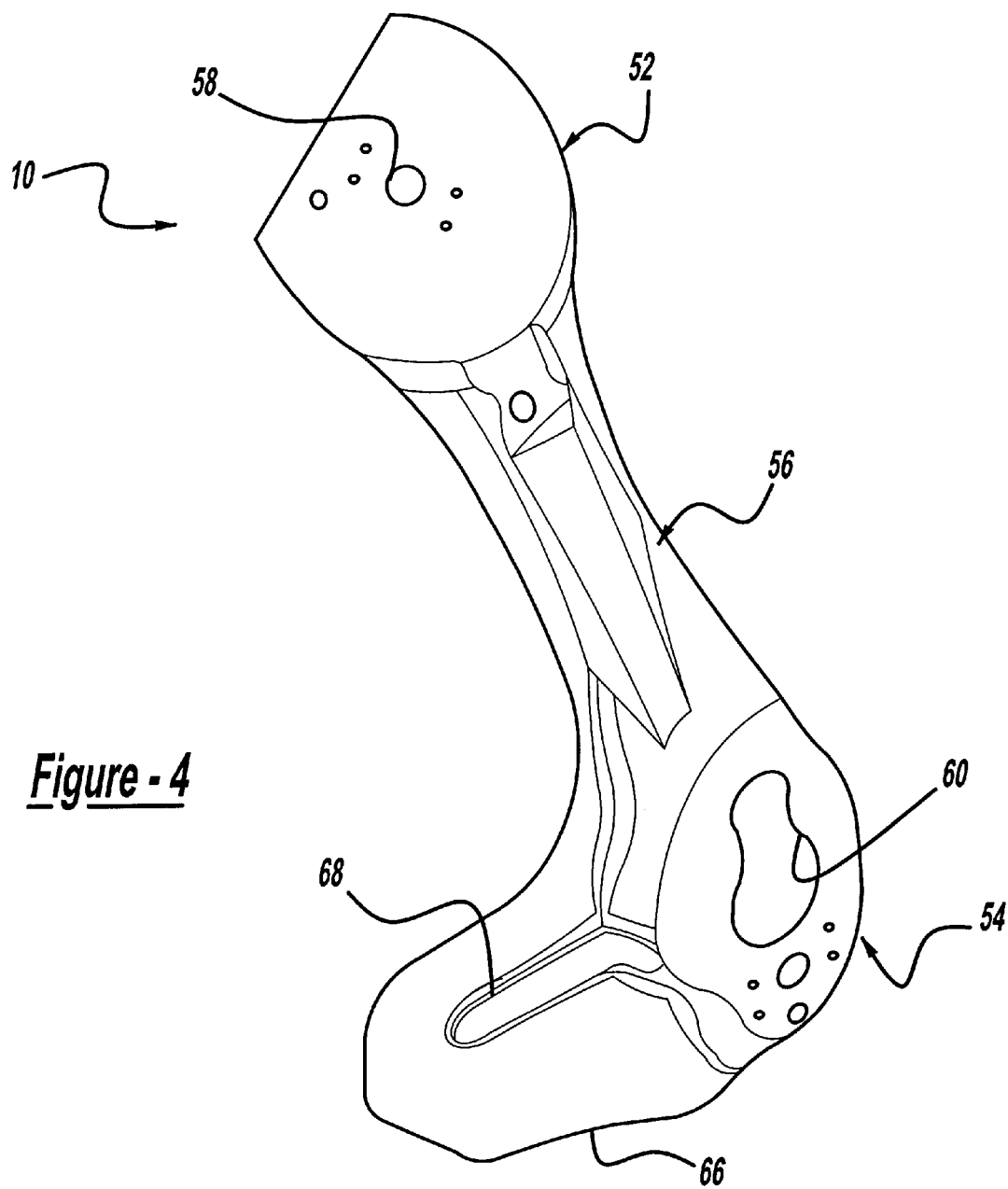
FIG. 4 is a perspective view of the reinforcement member of the present invention shown removed from the vehicle for purposes of illustration.

With specific reference to the perspective view of FIG. 4, the reinforcement member 10 of the present invention is preferably illustrated to comprise a unitarily formed structure made of metal or other suitable material. The reinforcement member is shown to generally include an upper portion 52 and a lower portion 54 interconnected by an intermediate neck region 56. The neck portion 56 of the reinforcement member 10 includes a raised area adapted to resist columnar buckling forces generated by class 1 pulley effect of mounting the turning loop 46 above the retractor mechanism 42.

The upper portion 52 includes an aperture 58 adapted to receive a fastener (not specifically shown) for attachment of the turning loop 46 thereto. The lower portion 54 of the reinforcement member 10 defines an opening 60 for attachment of the retractor assembly 42. It will be understood that the attachment of the turning loop 46 and retractor assembly 42 is conventional in nature. In the embodiment illustrated, the aperture 58 and the opening 60 lie on a longitudinally axis of the reinforcement member 10 which, as shown in FIG. 3, is substantially aligned with the directional orientation of the C-pillar 18.

The rear side (not shown) of the reinforcement member 10 is substantially smooth and intended to cooperate with an adjacent surface of the C-pillar 18 for attachment thereto. In the exemplary embodiment, the reinforcement member 10 is specifically adapted to be attached to an outboard side of the quarter inner member 26. In this regard, the reinforcement member 10 is welded or otherwise securely attached to the quarter inner member 26.

The reinforcement member 10 of the present invention is further shown to include an extension 66 which laterally extends rearward from the lower portion 54. The extension 66 is adapted to oppose a bending moment resulting from seat belt loads applied through the retractor mechanism 42 and the turning loop 46. The lateral extension 66 is oriented generally perpendicular to the longitudinal axis of the reinforcement member 50 and is shown to include a raised portion 68 which also is oriented perpendicular thereto. The raised portion 68 functions similar to the raised portion of the neck region 56 to resist buckling forces.

In the exemplary embodiment illustrated, the lateral extension 66 of the reinforcement member 50 is welded to the quarter inner member 26 immediately opposite a weld which attaches the strut tower 22 to the quarter inner member 26. As a result, the reinforcement member 10 is effectively welded to the strut tower 22, thereby establishing a load path from the turning loop 46 and the retractor mechanism 42 to the rail 34 through the C-pillar 18 and the strut tower 22.

While the above description constitutes the preferred embodiment of the invention, it will be appreciated that the invention is susceptible to modification, variation, and change without departing from the proper scope or fair meaning of the accompanying claims.

We claim:

1. A motor vehicle comprising:

a C-pillar including a strut tower;

an elongated rail secured to the strut tower;

a reinforcement member fixedly attached to said C-pillar, said reinforcement member including a first end and a second end, said reinforcement member being unitarily constructed and including a neck portion interconnecting said first end and said second end; and a rear seat belt restraint system secured to the reinforcement member;

whereby seat belt loads are transferred from said rear seat belt restraint system to said rail through said reinforcement member and said strut tower;

wherein said strut tower forms a portion of a wheel house of said vehicle.

2. The motor vehicle of claim 1, wherein said strut tower is connected to the remainder of said C-pillar below a horizontal plane parallel to a bottom edge of a rear window.

3. The motor vehicle of claim 1, wherein said neck portion includes means for resisting columnar buckling forces generated by loads received at said first and second end from said rear seat belt restraint system.

4. The motor vehicle of claim 1, wherein said second end includes an extension for opposing a bending moment.

5. A C-pillar in combination with a motor vehicle, the C-pillar adapted to support a rear seat belt restraint system having a turning loop and a retractor mechanism, the motor vehicle having an elongated rail, the C-pillar comprising:

a strut tower upwardly extending from and fixedly attached to the rail, said strut tower forming a portion of a wheel house of the vehicle;

a quarter inner member fixedly attached to said strut tower;

a unitarily constructed reinforcement member fixedly attached to said C-pillar and including an upper end and a lower end, said reinforcement member including a neck portion interconnecting said upper end and said lower end;

whereby loads are transferred from the rear seat belt restraint system to said strut tower through said reinforcement member and in turn to the rail.

6. The combination of claim 5, wherein said quarter inner member is connected to said strut tower below a horizontal plane parallel to a bottom edge of a rear window.

7. The combination of claim 6, wherein said neck portion includes means for resisting columnar buckling forces generated by loads received from said rear seat belt restraint system.

8. A motor vehicle comprising:

an elongated rail;

a C-pillar having a lower end fixedly secured to the rail, the C-pillar including a strut tower upwardly extending from and fixedly attached to the rail and a quarter inner member fixedly attached to the strut tower;

a reinforcement member fixedly attached to an outboard side of the quarter inner member; and an occupant restraint system having a turning loop and a retractor mechanism both fixedly connected to the reinforcement member such that loads are transferred from the occupant restraint system to the rail through the reinforcement member.

9. The motor vehicle of claim 8, wherein the strut tower forms a portion of a wheel house of the vehicle.

10. The motor vehicle of claim 8, wherein a lower end of said reinforcement member includes an extension for opposing a bending moment.

11. The motor vehicle of claim 8, wherein the turning loop is attached to an upper end of the reinforcement member and the retractor mechanism is attached to a lower end of the reinforcement member.

\* \* \* \* \*